Patented Oct. 26, 1954

2,692,831

UNITED STATES PATENT OFFICE 2,692,831

MARASCHINO STYLE CRANBERRIES AND PROCESS OF PREPARING SAME

Kenneth G. Weckel, Madison, Wis., and James E. Welch, Newark, N. J., assignors to Wisconsin Alumni Research Foundation, Madison, Wis., a corporation of Wisconsin No Drawing. Application November 3, 1952, Serial No. 318,516

7 Claims. (Cl. 99—103)

The present invention relates to maraschino style cranberries and the process of preparing the same. More specifically the invention is directed to the processing of cranberries in a form suitable for use in the bakery, confectionery, frozen dessert, mixed fruit, beverage and like fields.

Maraschino style cherries have been available for some time and their wide use in the bakery, cannery, confectionery, etc., fields is well known. The dictionary defines "maraschino" as a liqueur distilled from the fermented juice of the marasca, a small bitter wild cherry, and maraschino cherries as cherries preserved in maraschino. The term "maraschino cherry" in industry today, however, merely denotes a cherry which has been processed so as to have approximately 50 per cent sugar in the tissue. They are prepared by bleaching in a $SO_2$-lime brine, removal of the $SO_2$, blanching and syruping. The cherries are also usually dyed, e. g., red or green, and may have flavor added.

Cranberries are used extensively as a seasonal market item in the fresh berry form for home use. Commercial use of cranberries in processed products, however, has been limited for the most part to cranberry sauce, jellies and the like, the use of which is also traditionally seasonable, e. g., during the cold weather periods and especially the holidays Thanksgiving, Christmas and New Year's.

The need for finding new uses for cranberries, and specifically the development of a cranberry product that could and would be widely used throughout all seasons, has been recognized by the cranberry industry for years. Prior attempts, however, to produce a product in satisfactory form for use in the bakery, confectionery, frozen dessert, mixed fruit, etc. fields, i. e., fields that have substantial uses in all seasons, have proven unsuccessful. One of the primary difficulties was found to reside in the great tendency of the cranberry, unlike the cherry, to disintegrate on processing and attempts to avoid this resulted in an unattractive, "shriveled-up" product of little or no commercial value. Both of these difficulties became particularly pronounced when the berries were subjected to the baking or cooking temperatures associated with the preparation of commercial food-stuffs. As a result, up until the discoveries leading to the present invention, there has been relatively little use of cranberries in food except sauces and the like, and no cranberry product of the type desired has been available for use in the bakery, confectionery and like fields.

The principal object of the present invention is to provide a maraschino style cranberry characterized by its plumpness and firmness and a process of producing the same. Another object of the present invention is to provide an improved process for preparing maraschino style cranberries which do not disintegrate or permanently shrivel during and after processing.

Still another object of the invention is to provide a novel cranberry product suitable for use in the bakery, confectionery, frozen dessert, mixed fruit, beverage and like fields.

Other objects will be apparent as the description proceeds.

At the start of investigation leading to the present invention, it seemed that the best approach would be to follow the conventional operations (bringing in $SO_2$-lime, removal of $SO_2$, blanching and dyeing and syruping) employed in the preparation of maraschino cherries. This was tried but proved unsuccessful. The cranberries, for example, ruptured and as the processing proceeded, disintegrated. It was next decided to puncture the berries in a preliminary treatment before processing. This also proved unsuccessful. It was next decided to provide a vacuum treatment. This also proved unsuccessful and failed to solve the problem when used with or without the preliminary puncturing step. From these attempts, all failures, it was clear that the physical and chemical properties of the cranberry were such as to require special procedures to retain the original (firm-plump) form of the berry.

Modifications in the bleaching brine with and without soaking in additional chemical baths were then tried. These and other treatments together with various modifications in the blanching and syruping operations only produced commercially unsatisfactory disintegrated or shriveled berries. In one case after syruping, the berries appeared to be satisfactory, but on standing, the majority shriveled in one week's time. Also, in no case could the berries be cooked above 160° F. without all splitting.

In continued investigations it was discovered that the leaching step was critical, and specifically that the leaching of the acid berries after bleaching should be continued until the pH in the berry was raised to about 3.8–3.9. With further investigation it was discovered that attractive firm, plum, stable berries suitable for use in the bakery, confectionery and like fields could be produced by (a) puncturing or pricking the berries, (b) bleaching the punctured berries in a dilute $SO_2$-lime brine, (c) leaching the bleached berries until the pH in the berry was about 3.8–3.9, (d) evacuating the leached berries by application of vacuum, (e) blanching the evacuated berries and then (f) dyeing and syruping the blanched berries.

The following detailed example will serve to illustrate the invention.

1. *Puncturing.*—The cranberries should first be punctured. This may be accomplished in various ways known in the art for pricking fruit. In the investigations leading to the present invention this operation was accomplished by the use of No. 16 brads fixed in adjacent cylinders, one revolving clockwise, the other counterclockwise, and by the use of flat plates in which the brads were spaced in alternate rows. Care should be taken in this operation to avoid tearing the skin tissues of the cranberries. The punctures, about 4–8 in number, should penetrate about half way into the berry with about six punctures distributed around each berry being preferred. Berries punctured on one side only are apt to bleach improperly and tend to burst in subsequent processing steps.

2. *Bleaching.*—The punctured cranberries are placed in containers that can be sealed such as glass lined tanks or paraffined casks, and are then covered with an aqueous brine containing about 1.0% by weight of $SO_2$ and about 0.5% by weight of CaO. The containers are closed and the bleaching in the sulfur dioxide-slaked lime reaction mixture allowed to proceed at room temperature for about 3–6 days and preferably 4–5 days. At 48 hours the $SO_2$-lime solution has a pH of about 2.6 and the berries were characterized by a low grade of firmness. At 120 hours the pH of the solution was about 2.86 and the berries were characterized by a relatively firm texture. Similarly, berries held for 96 hours were characterized by greater firmness than berries held for 72 hours. Increased levels of calcium in the brine had only a slight beneficial effect on firmness. Excess $SO_2$ over and above that needed for bleaching should be avoided.

3. *Leaching.*—The bleached cranberries are leached with continuously circulating fresh water. One of the preferred ways of doing this is to introduce water at the bottom of the container in sufficient force and volume to agitate the layer of berries. The leaching should be completed as rapidly as possible and may require about 3 to 6 days. In any event it should be sufficient to establish in the berry a pH of 3.8 to 3.9. Above and below this pH value the processing quality of the berries is reduced sharply. In addition to measuring the pH of the juice of the bleached berries the termination of the leaching period may also be determined (a) by measuring $SO_2$ concentration by titration of the juice with a N/10 iodine solution and (b) by a dye test by adding a few drops of a 2 per cent aqueous solution of 2,6-dichlorophenol-endophenol to the juice. The berries are considered properly leached when in (a) the final $SO_2$ concentration of the juice is not above 50 p. p. m., and when in (b) the blue color of the dye remains for one minute.

4. *Evacuating.*—The leached berries are next subjected to a vacuum treatment. This is readily done by transferring the berries to a chamber, covering them with water at about 130° F. and applying vacuum of about 23–25 inches for about 15–20 minutes. After evacuation the berries should be in a shriveled condition and sink when placed in water at room temperature. These characteristics serve as a guide for determining when the berries are in proper condition for the subsequent blanching or cooking treatment.

5. *Blanching.*—The shriveled evacuated berries are next blanched. This is done by placing the berries in a steam jacketed kettle, covering with warm (100° F.) water and heating to boiling for 2–4 minutes. The temperature of the water is then reduced promptly to about 170° F. and held for a period of about 10–15 minutes. This blanching treatment is sufficient to condition the tissues of the berries so that they are able to retain the sugar syrup which is added in a following operation.

6. *Dyeing and syruping.*—These operations may be varied to some extent as different certified food dyes and amounts of sweetening agents may be employed. Also, for the most part they follow the corresponding steps employed in the processing of maraschino style cherries. One of the preferred methods of carrying out the dyeing and syruping operations on cranberries processed as described above is as follows.

The blanched cranberries are washed in fresh cold water. After washing, the cranberries are covered with water containing 0.07% amaranth dye and 0.10% calcium carbonate both calculated at per cent by weight based on the berries. The resulting mixture is heated to 170° F. for a period of about ten minutes. When the berries are sufficiently colored the dye is fixed by addition of a solution of citric acid to bring the final solution up to about 0.5% citric acid. The time necessary for the attainment of the desired level of color varies with the particular dye used and, in some cases, with different lots or types of berries, but in any event should be kept as short as possible. Tests using periods varying from 0.5 to 48 hours for coloring purposes indicate that in most cases dye penetration is satisfactory and better turgidity of tissue is obtained in the shorter periods.

Immediately following the coloring of the berries sufficient sucrose syrup is added to the dye solution to establish a syrup concentration of about 25 degrees Brix. The syrup-berry mixture is heated slowly to 200° F., then allowed to self-cool to 140° F. at which point it is held until a final Brix concentration of 55 degrees is obtained. The evaporation of water should be so controlled during this operation that the concentration of syrup is increased approximately 6 degrees Brix each 24 hours. Concentrated hot syrup should be added to maintain the desired concentration. When the final concentration of 55 degrees Brix is obtained the mixture is boiled and then either transferred to final containers and sealed or to separate tanks for a period of about a week, where at room temperature further equilibrium of the syrup-berry mixture is established. In the latter procedure new 50 degrees Brix syrup at 190° F. may be added to the berries and the mixture then placed in sealed containers and pasteurized at about 180° F. for 20 minutes. The pH of the sugar mixture during the syruping process appears to have some effect on the ultimate firmness of the berries. Maximum turgidity was obtained at a pH of about 3.5.

Candied style cranberries

The procedure followed in processing this style of highly sweetened cranberries is identical with that of the maraschino style cranberries described above up to the point where a 55 degrees Brix sugar concentration is established. At this point an invert sugar syrup at a concentration of 65 degrees Brix is prepared. To this syrup is added 0.50% citric acid and 0.20% calcium chloride and the resulting solution heated to 212° F. for a period of about 25 minutes. The berries are then transferred from the 55 degrees Brix syrup to the hot invert sugar syrup, sufficient syrup being used to cover the berries. The 65 degrees Brix syrup should be maintained at a temperature of 200° F. when mixing with the berries. The syrup-berry mixture is allowed to cool to 140° F. and is held at this temperature for 24 hours. After this holding period the berries are removed and the syrup is heated to 212° F. and held at this temperature for a period of about 10 minutes. The evaporation of water should be controlled during this operation so that the concentration of the syrup is increased to 75 degrees Brix at a temperature of 200° F. The berries are mixed with the resulting syrup at 200° F. and are then transferred to glass containers and allowed to cool, and held for about one week. After this period the berries are drained and bottled in glass jars or surface dried at room temperature and packed as ordinary candy. The addition of citric acid and the heating of the syrup to 212° F. described above allows partial inversion of the cane sugar present to take place, thus preventing its crystallization.

The cranberries processed as described above are firm and plump and are of the type that can be readily utilized successfully in various types of food products. The maraschino style cranberry, for example, has been used as a berry garnish for cakes and sweet dough goods (added prior to baking), as fruit for ice cream and cranberry sherbert and fruit cocktail, as well as for the center of chocolate coated cream centers. The maraschino style cranberry, as pointed out above, is also readily adaptable for making candied cranberries which also may be used in bakery and confectionery products, etc., i. e., foods widely used throughout all seasons of the year.

We claim:

1. The process of preparing maraschino style cranberries which comprises puncturing the cranberries, bleaching the punctured cranberries, leaching the bleached cranberries until the pH in the berry is about 3.8–3.9, subjecting the leached cranberries to a vacuum treatment, blanching the evacuated cranberries and then subjecting the blanched cranberries to dyeing and syruping treatments to color and introduce sugar into the berries.

2. Maraschino style cranberries produced by the process of claim 1.

3. The process of preparing maraschino style cranberries which comprises puncturing the cranberries, bleaching the punctured cranberries in a $SO_2$-lime brine, leaching the bleached cranberries until the pH in the berry is about 3.8–3.9, subjecting the leached cranberries to a vacuum treatment, blanching the evacuated cranberries and then subjecting the blanched cranberries to dyeing and syruping treatments to color and introduce sugar into the berries.

4. The process of preparing maraschino style cranberries which comprises puncturing the cranberries, said punctures being distributed around and penetrating about half way in the berry, bleaching the punctured cranberries in a dilute $SO_2$-lime brine, leaching the bleached cranberries until the pH in the berry is about 3.8–3.9, subjecting the leached cranberries to a vacuum treatment until the berries shrivel and sink in water at room temperature, blanching the evacuated cranberries and then subjecting the blanched cranberries to dyeing and syruping treatments to color and introduce sugar into the berries.

5. Maraschino style cranberries produced by the process of claim 4, said cranberries being firm and plump and adaptable for use in the bakery, confectionery and like fields.

6. The process of preparing maraschino style cranberries which comprises puncturing the cranberries, said punctures being distributed around and penetrating about half-way in the berries; bleaching the punctured cranberries for about 4–5 days in an aqueous brine made up of about 1.0% by weight of $SO_2$ and 0.5% by weight of CaO; leaching the bleached cranberries in fresh water until the pH in the berry is about 3.8–3.9, said fresh water being introduced in sufficient force and volume to agitate the berries during leaching; evacuating the berries by covering them with water heater to about 130° F. and applying about 23–25 inches of vacuum for about 15–20 minutes; blanching the evacuated berries by heating them in warm water to boiling for about 2–4 minutes, dyeing the blanched cranberries in an aqueous solution containing small amounts of amaranth dye and calcium carbonate, fixing the dye by addition of a small amount of citric acid, adding sufficient sugar to the dye solution to provide a syrup concentration of about 25 degrees Brix, heating the resulting solution to about 200° F., allowing the solution to cool to about 140° F. and holding the solution at this temperature until a final concentration of about 55 degrees Brix is obtained.

7. Maraschino style cranberries produced by the process of claim 6, said cranberries being firm and plump and adaptable for use in the bakery, confectionery and like fields.

References Cited in the file of this patent

UNITED STATES PATENTS

| Number | Name | Date |
| --- | --- | --- |
| 2,019,030 | Tucker | Oct. 29, 1935 |